(12) United States Patent
Kim

(10) Patent No.: US 8,814,711 B2
(45) Date of Patent: Aug. 26, 2014

(54) BALL TYPE CONSTANT VELOCITY JOINT FOR VEHICLE

(75) Inventor: Pil Ki Kim, Geyongsangnam (KR)

(73) Assignee: Hyundai Wia Corporation, Gyeongsangnam-Do (KR)

( * ) Notice: Subject to any disclaimer, the term of this patent is extended or adjusted under 35 U.S.C. 154(b) by 0 days.

(21) Appl. No.: 13/327,347

(22) Filed: Dec. 15, 2011

(65) Prior Publication Data

US 2013/0123027 A1 May 16, 2013

(30) Foreign Application Priority Data

Nov. 16, 2011 (KR) .................. 10-2011-0119781

(51) Int. Cl.
*F16D 3/2237* (2011.01)
*F16D 3/2245* (2011.01)
*F16D 3/223* (2011.01)

(52) U.S. Cl.
CPC .............. *F16D 3/223* (2013.01); *F16D 3/2245* (2013.01); *F16D 2003/22309* (2013.01); *Y10S 464/906* (2013.01)
USPC .......................................... 464/145; 464/906

(58) Field of Classification Search
USPC ......................... 464/144–146, 906
See application file for complete search history.

(56) References Cited

U.S. PATENT DOCUMENTS

2006/0217207 A1 * 9/2006 Hoshino et al. .............. 464/145
2012/0165105 A1 * 6/2012 Fujio et al. ................... 464/145

FOREIGN PATENT DOCUMENTS

| JP | 2004332817 |   | 11/2004 |
| JP | 2004332817 | A * | 11/2004 |
| JP | 2011080555 |   | 4/2011 |
| JP | 2011080555 | A * | 4/2011 |

* cited by examiner

*Primary Examiner* — Gregory Binda
*Assistant Examiner* — Josh Skroupa
(74) *Attorney, Agent, or Firm* — Stetina Brunda Garred & Brucker

(57) ABSTRACT

Provided is a ball type constant velocity joint for a vehicle. The ball type constant velocity joint includes an inner race installed at an end of a shaft, an outer race installed outside the inner race, a plurality of hails for transmitting rotational power of the inner race to the outer race, and a cage having windows for supporting the balls, wherein a ball track of the outer race is divided into two sections consisting of an outer race radial track and an outer race linear track contiguous to the outer race radial track, and when a joint angle is not created, a rotation center of the outer race radial track and a rotation center of the inner race linear track are positioned at the same point on a vertical center axis and have the same vertical offset amount.

10 Claims, 9 Drawing Sheets

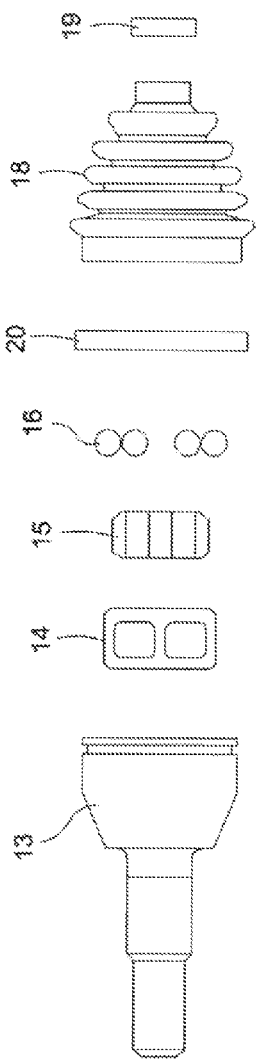
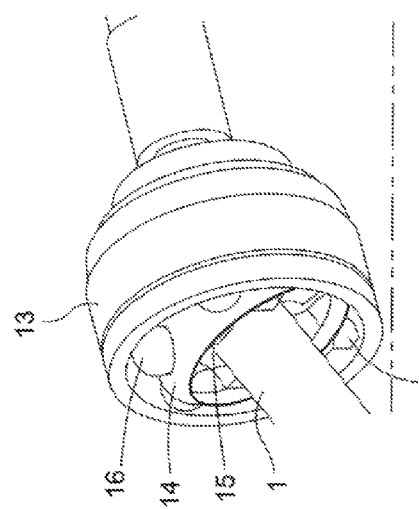
FIG. 3 (Prior Art)
FIG. 4 (Prior Art)

BALL TYPE CONSTANT VELOCITY JOINT FOR VEHICLE

CROSS-REFERENCE TO RELATED APPLICATION

This application claims priority to and the benefit of Korean Patent Application No. 10-2011-0119781, filed on Nov. 16, 2011, the entire content of which is incorporated herein by reference.

STATEMENT RE: FEDERALLY SPONSORED RESEARCH/DEVELOPMENT

Not Applicable

BACKGROUND OF THE INVENTION

1. Field of the Invention

The present invention relates to a ball type constant velocity joint for a vehicle, and more particularly, to a ball type constant velocity joint for a vehicle, which can increase a maximum joint angle amount by making rotation centers of radial tracks of outer and inner races positioned at the same point on the vertical center axis while having the same vertical offset amount by dividing the ball track of an outer race into two sections of a radial track and a linear track of the outer race and dividing the ball track of an inner race into two sections of a linear track and a radial track of the inner race, and can reduce a contact pressure between a ball and the outer race.

2. Description of the Related Art

In general, a joint functions to transmit rotational power (torque) between two rotation shafts which meet each other at an angle. In the case of a propeller shaft having a small power transmission angle, a hook joint, a flexible joint, etc. are used, and in the case of the driving shaft of a front wheel drive vehicle having a large power transmission angle, a constant velocity joint is used.

Since the constant velocity joint can reliably transmit power at a constant velocity even when an angle between a driving shaft and a driven shaft is large, the constant velocity joint is mainly used for the axle shaft of an independent suspension type front wheel drive vehicle. When viewed from a shaft, a tripod type constant velocity joint is provided to one end of the shaft which faces an engine (i.e., the inboard-side end), and a ball type joint is provided to the other end of the shaft which faces a tire (i.e., the outboard-side end).

FIG. 1 is a cross-sectional view illustrating conventional constant velocity joints, and FIG. 2 is a schematic view illustrating an external appearance of the conventional constant velocity joints shown in FIG. 1.

As shown in FIGS. 1 and 2, the conventional constant velocity joints comprise a tripod type constant velocity joint which is provided to the right end of a shaft 1 which faces an engine (the inboard-side end) and a ball type constant velocity joint provided to the left end of the shaft 1 which faces a tire (the outboard-side end).

The tripod type constant velocity joint installed on the right end of the shaft 1 (which faces the engine) comprises a housing 2 which transmits rotational power of the engine (not shown) and is defined with track grooves on the inner surface thereof, the shaft 1 which receives the rotational power from the housing 2 and rotates, a spider 3 which is disposed in the housing 2, is coupled to one end of the shaft 1 to connect the housing 2 and the shaft 1 with each other and is formed with three trunnions to be respectively inserted into the track grooves of the housing 2, needle rollers 6 which are arranged on the circumferential outer surface of each trunnion of the spider 3, inner rollers 5 each of which is arranged around the needle rollers 6 for each trunnion of the spider 3, outer rollers 4 each of which is installed on the circumferential outer surface of each inner roller 5 to reduce friction between the housing 2 and the shaft 1, a retainer ring 8 which is installed on the upper ends of the needle rollers 6 and of each inner roller 5, a boot 10 having one end which is connected to the housing 2 and the other end which is connected to the shaft 1, and clamping bands 11 and 12 which clamp both ends of the boot 10.

The ball type constant velocity joint installed on the left end of the shaft 1 (which faces the tire) comprises an inner race 15 which is installed on the left end of the shaft 1 to receive the rotational power from the tripod type constant velocity joint and to then rotate, an outer race 13 which is installed around the inner race 15, balls 16 for transmitting the rotational power of the inner race 15 to the outer race 13, a cage 14 for supporting the balls 16, a sensor ring 17 which is installed around the outer race 13, a boot 18 having one end which is connected to the shaft 1 and the other end which is connected to the outer race 13, and clamping bands 19 and 20 which clamp both ends of the boot 18.

A damper 21 is installed at the center of the shaft 1 using bands 22 and 23 and has a weight 211 installed in a body 212.

Hereafter, the operation of the conventional constant velocity joints constructed as mentioned above will be described.

As the rotational power outputted from an engine (not shown) is transmitted to the housing 2 through a transmission (not shown), the housing 2 is rotated. The rotational power of the housing 2 is transmitted to the spider 3 through the outer rollers 4, the inner rollers 5 and the needle rollers 6, and then the shaft 1 to which the spider 3 is coupled is rotated. The rotational power of the shaft 1 is transmitted to the outer race 13 through the inner race 15 and the balls 16, and then the wheel (not shown) connected to the outer race 13 is rotated.

In the tripod type constant velocity joint which is provided to the right end of the shaft 1 which faces the engine (i.e., the inboard-side end), as the outer rollers 4 slide in the track grooves of the housing 2, the rotation angle of the shaft 1 which is operationally associated with the outer rollers 4 is changed, so that a joint angle is created to follow the displacement of a vehicle. In the ball type constant velocity joint which is provided to the left end of the shaft 1 which faces the tire (i.e., the outboard-side end), the rotation angle of the outer race 13 is changed due to the presence of the balls 16, so that a joint angle is created to follow the displacement of the vehicle.

The boot 10 of the tripod type constant velocity joint and the boot 18 of the ball type constant velocity joint respectively function to enclose the tripod type constant velocity joint and the ball type constant velocity joint, so that the tripod type constant velocity joint and the ball type constant velocity joint are prevented from being contaminated by foreign substances.

In addition, when the torque outputted from the engine and the transmission through the shaft 1 to wheels, unbalanced rotation may occur at a certain rotation angle of the shaft 1 rotating at high speed, which may result in undesired vibrations and adversely affect the operation of a drive system. In order to prevent the undesired vibrations due to unbalanced rotation, the damper 2 installed at the center of the shaft 1 may prevent booming noises from occurring to the shaft 1 rotating at high speed due to the detrimental vibration frequency.

FIG. 3 is an exploded view illustrating a conventional ball type constant velocity joint for a vehicle, FIG. 4 is a perspective view of the conventional ball type constant velocity joint shown in FIG. 1, FIG. 5 is a cross-sectional view illustrating the conventional ball type constant velocity joint for a vehicle before a joint angle is created, and FIG. 6 is a cross-sectional view illustrating the conventional ball type constant velocity joint shown in FIG. 5 after a joint angle is created.

As shown in FIGS. 3 to 6, in the conventional ball type constant velocity joint for a vehicle, the ball 16 is fixed by the cage 14 and the inner race 15. During steering, the ball 16 is moved in the groove formed on a circumferential inner surface of the outer race 13 in a lengthwise direction.

A ball track (OBT) of the outer race 13 is formed to trace a radius R2 ranging from a rotation center r2 and a ball track (IBT) of the inner race 15 is formed to trace a radius R3 from a rotation center r3.

A funnel angle (f) formed between the rotation center r2 of the outer race ball track OBT and the rotation center r3 of the inner race ball track IBT at the center of the balls 36 is in a range of 14 to 17 degrees for a 6-ball type joint and is in a range of 8 to 14 degrees for a 8-ball type joint. The funnel angle (f) facilitates bending and rotating of the joint. Here, if the funnel angle (f) is not secured, the joint may get jammed and the efficiency of the joint may be lowered.

The rotation center r2 of the outer race ball track OBT and the rotation center r3 of the inner race ball track IBT are positioned to be parallel with each other by a constant offset amount R1 with regard to a joint rotation center r1. When a joint angle is created, the cage 14 and the balls 16 rotate by half a joint angle amount of the inner race 15, and the rotation center r2 of the outer race ball track OBT and the rotation center r3 of the inner race ball track IBT are rotated along a radius corresponding to the offset amount R1 with respect to the joint rotation center r1.

However, the conventional ball type constant velocity joint is limited in that the maximum joint angle amount is in a range of 46 to 50 degrees.

BRIEF SUMMARY OF THE INVENTION

Accordingly, the present invention has been made to solve the above-mentioned problems occurring in the prior art, and an object of the present invention is to provide a ball type constant velocity joint for a vehicle, which can increase a maximum joint angle amount by making rotation centers of radial tracks of outer and inner races positioned at the same point on the vertical center axis while having the same vertical offset amount by dividing the ball track of an outer race into two sections of a radial track and a linear track of the outer race and dividing the ball track of an inner race into two sections of a linear track and a radial track of the inner race, and can reduce a contact pressure between a ball and the outer race.

In accordance with one aspect of the present invention, there is provided a ball type constant velocity joint for a vehicle, including an inner race installed at an end of a shaft, an outer race installed outside the inner race, a plurality of balls for transmitting rotational power of the inner race to the outer race, and a cage having windows for supporting the balls, wherein a ball track of the outer race is divided into two sections consisting of an outer race radial track and an outer race linear track contiguous to the outer race radial track, and when a joint angle is not created, a rotation center of the outer race radial track and a rotation center of the inner race radial track are positioned at the same point on a vertical center axis and have the same vertical offset amount.

The rotation center of the outer race radial track and the rotation center of the inner race radial track may be positioned at the same point above the joint rotation center on the vertical center axis.

When the rotation center of the outer race radial track and the rotation center of the inner race radial track are positioned above the joint rotation center on the vertical center axis, a ratio (f1/PCD) of the offset amount (f1) to a pitch circle diameter (PCD) may be in the range of 0 to 0.2.

The rotation center of the outer race radial track and the rotation center of the inner race radial track may be positioned at the same point below the joint rotation center on the vertical center axis.

When the rotation center of the outer race radial track and the rotation center of the inner race radial track are positioned below the joint rotation center on the vertical center axis, a ratio (f1/PCD) of the offset amount (f1) to a pitch circle diameter (PCD) may be greater than 0.

An inclination angle of the outer race linear track may be in the range of 0 to 10 degrees.

An inclination angle of the inner race linear track may be in the range of 0 to 10 degrees.

When a joint angle is not created, the ball may be positioned between the outer race linear track having an inclination angle and the inner race linear track having an inclination angle.

When a joint angle is created, one or more balls may be positioned between the outer race radial track having an inclination angle and the inner race radial track having an inclination angle.

When a joint angle is created, the joint angle may become 54 degrees to the maximum.

As described above, in the ball type constant velocity joint for a vehicle according to the present invention, a maximum joint angle amount can be increased by making rotation centers of radial tracks of outer and inner races positioned at the same point on the vertical center axis while having the same vertical offset amount by dividing the ball track of an outer race into two sections of a radial track and a linear track of the outer race and dividing the ball track of an inner race into two sections of a linear track and a radial track of the inner race, and a contact pressure between a ball and the outer race can be reduced.

Additional aspects and/or advantages of the invention will be set forth in part in the description which follows and, in part, will be obvious from the description, or may be learned by practice of the invention.

BRIEF DESCRIPTION OF THE DRAWINGS

The objects, features and advantages of the present invention will be more apparent from the following detailed description in conjunction with the accompanying drawings, in which:

FIG. 3 is an exploded view illustrating a conventional ball type constant velocity joint for a vehicle;

FIG. 4 is a perspective view of the conventional ball type constant velocity joint shown in FIG. 1;

DETAILED DESCRIPTION OF THE INVENTION

Hereinafter, a preferred embodiment of the present invention will be described with reference to the accompanying drawings with several exemplary or preferred embodiments thereof. Other advantages and features of the invention will also become apparent upon reading the following detailed description and upon reference to the accompanying drawings.

However, the following descriptions of such embodiments are intended primarily for illustrating the principles and exemplary constructions of the present invention, and the present invention is not specifically limited to these exemplary embodiments. Thus, one skilled in the art can appreciate or recognize that various modifications, substitutions and equivalents thereof can be made thereto without departing from the spirit and scope of the present invention.

As shown in FIGS. 7 to 15, the ball type constant velocity joint for a vehicle according to an embodiment of the present invention includes an inner race 35 installed at an end of a shaft, an outer race 33 installed outside the inner race 35, a plurality of balls 36 for transmitting rotational power of the inner race 35 to the outer race 33, and a cage 34 having windows for supporting the balls 36. Here, a ball track 33B of the outer race 33 is divided into two sections consisting of an outer race radial track 33B1 having a radius R1 from the joint rotation center O and an outer race linear track 33B2 having an inclination angle 33C, which is contiguous to the outer race radial track 33B1. A ball track 35B of the inner race 35 is divided into two sections consisting of an inner race linear track 35B2 having an inclination angle 35C and an inner race radial track 35B1 having a radius R2 from the joint rotation center O, which is contiguous to the inner race linear track 35B2. When a joint angle is not created, a rotation center O1A of the outer race radial track 33B1 and a rotation center O2A of the inner race linear track 35B1 are positioned at the same point on a vertical center axis Z and have the same vertical offset amount (f1, f2).

Figure 1:
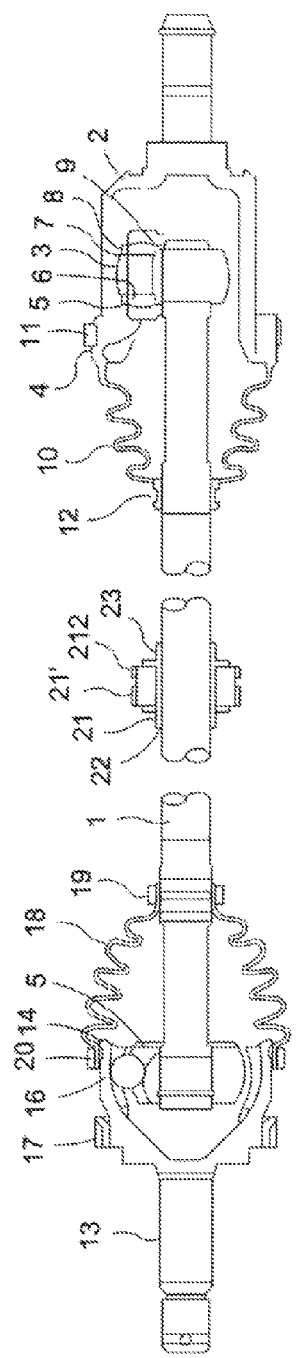
FIG. 1 is a cross-sectional view illustrating a conventional constant velocity joints.
Figure 2:
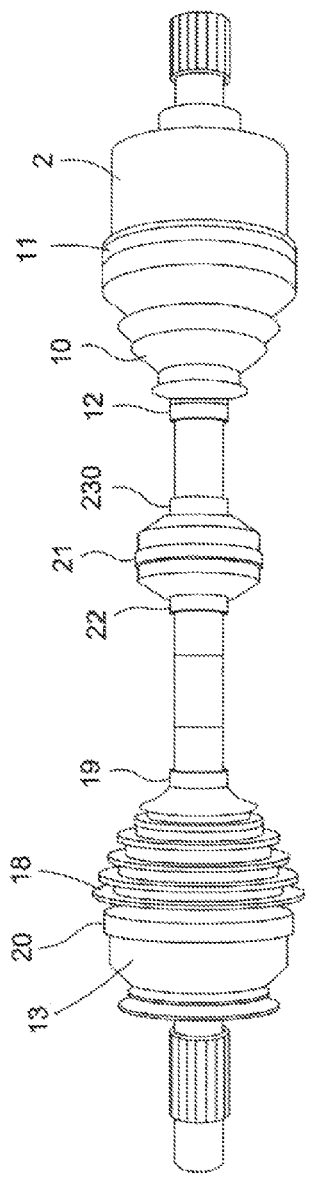
FIG. 2 is a schematic view illustrating an external appearance of the conventional constant velocity joints shown in FIG. 1.
Figure 5:
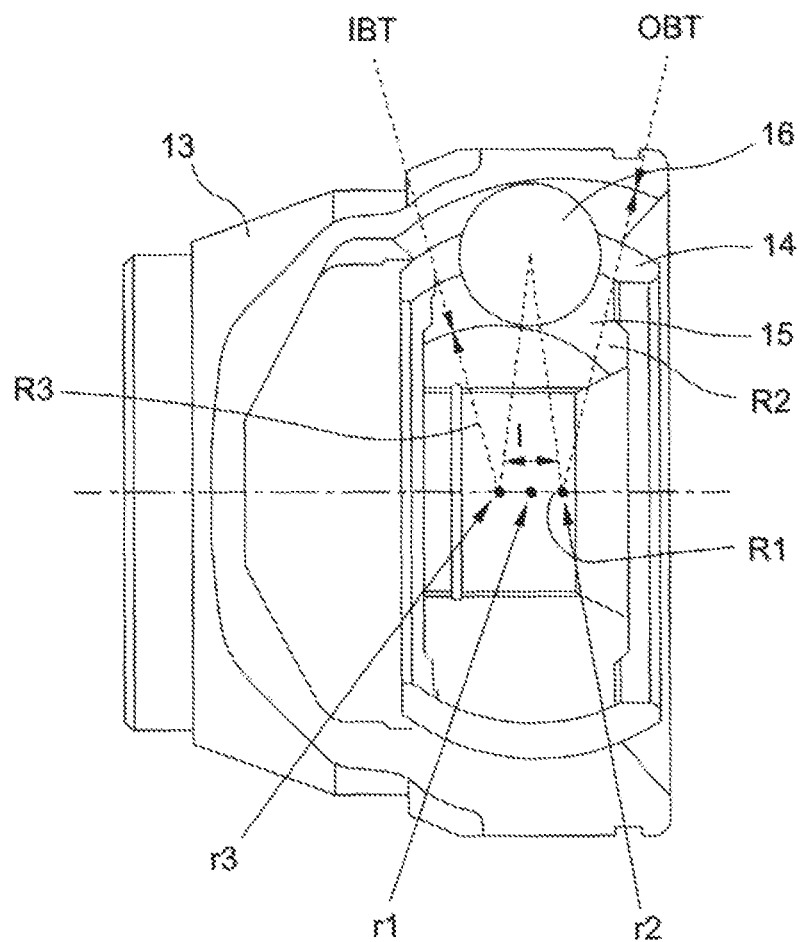
FIG. 5 is a cross-sectional view illustrating the conventional ball type constant velocity joint for a vehicle before a joint angle is created.
Figure 6:
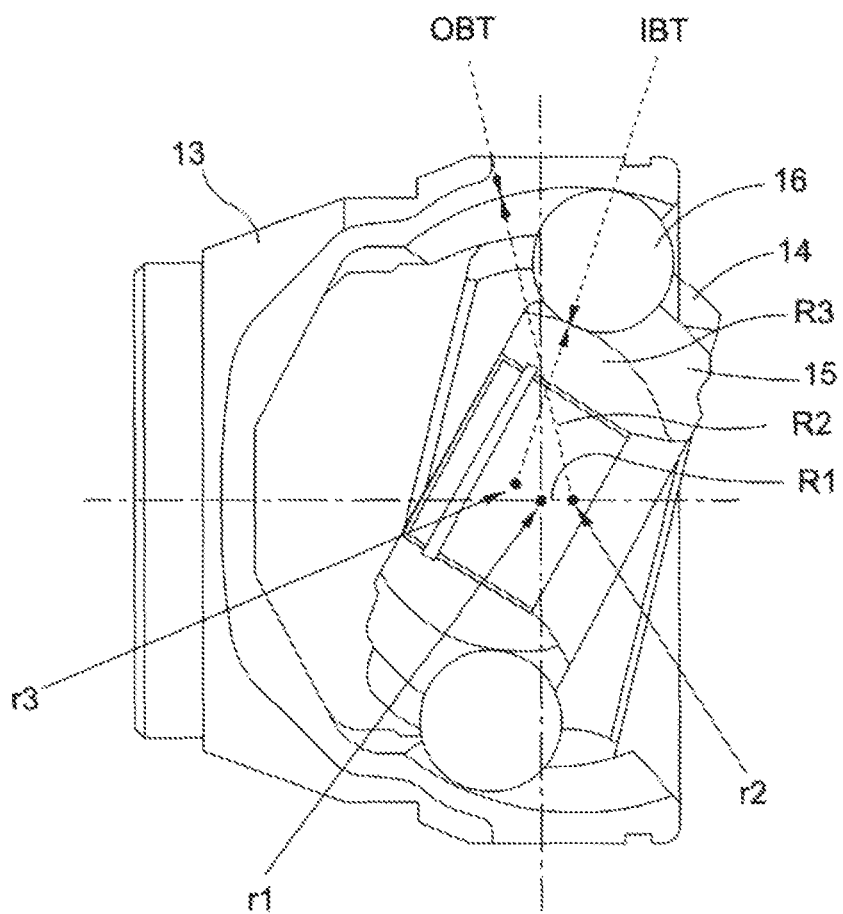
FIG. 6 is a cross-sectional view illustrating the conventional ball type constant velocity joint shown in FIG. 5 after a joint angle is created.
Figure 7:
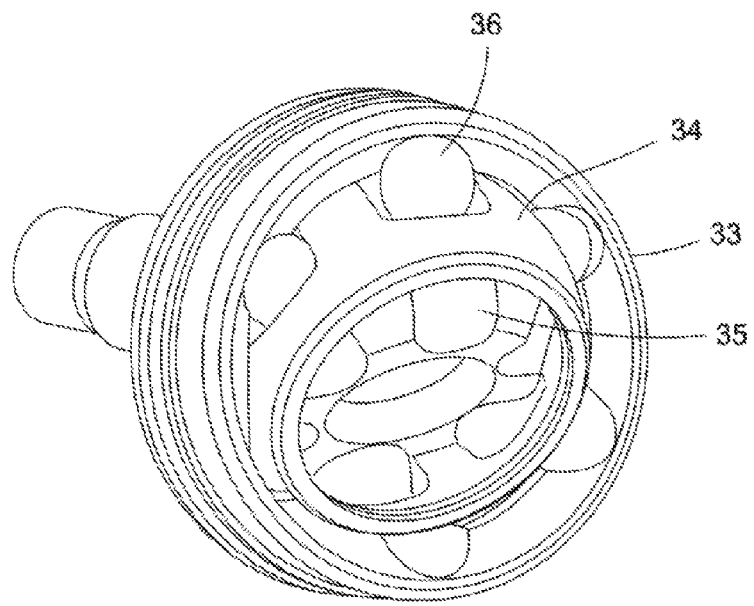
FIG. 7 is a perspective view illustrating a ball type constant velocity joint for a vehicle according to an embodiment of the present invention.
Figure 8:
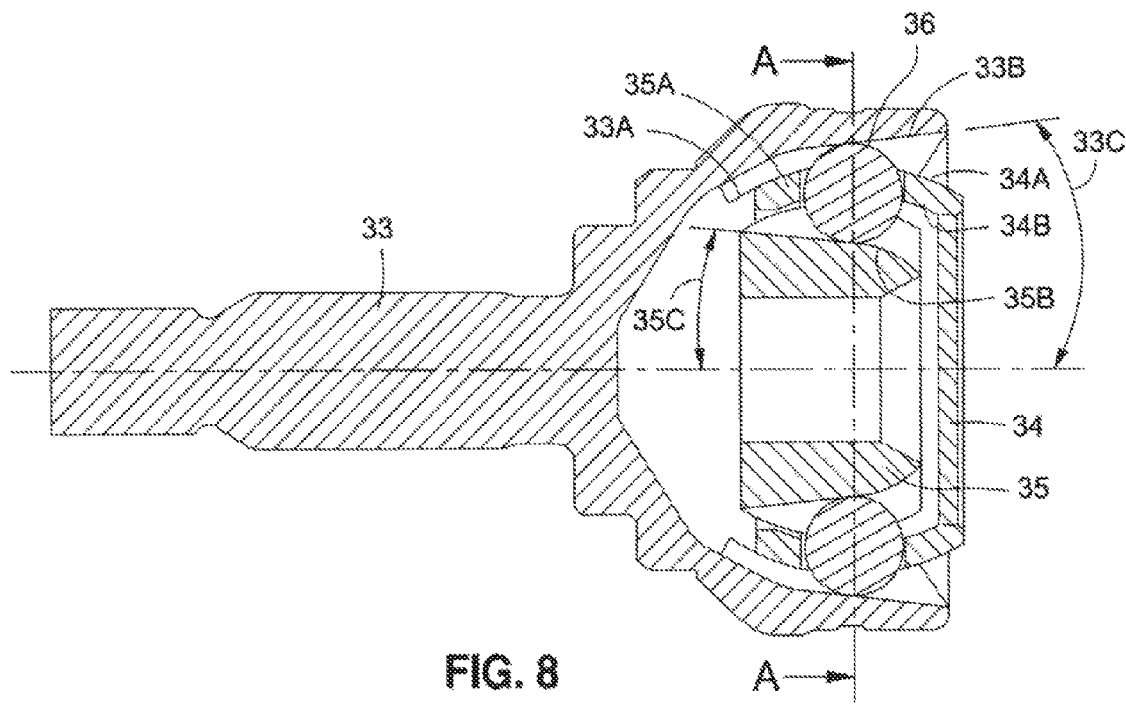
FIG. 8 is a cross-sectional view illustrating a ball type constant velocity joint for a vehicle shown in FIG. 7.
Figure 9:
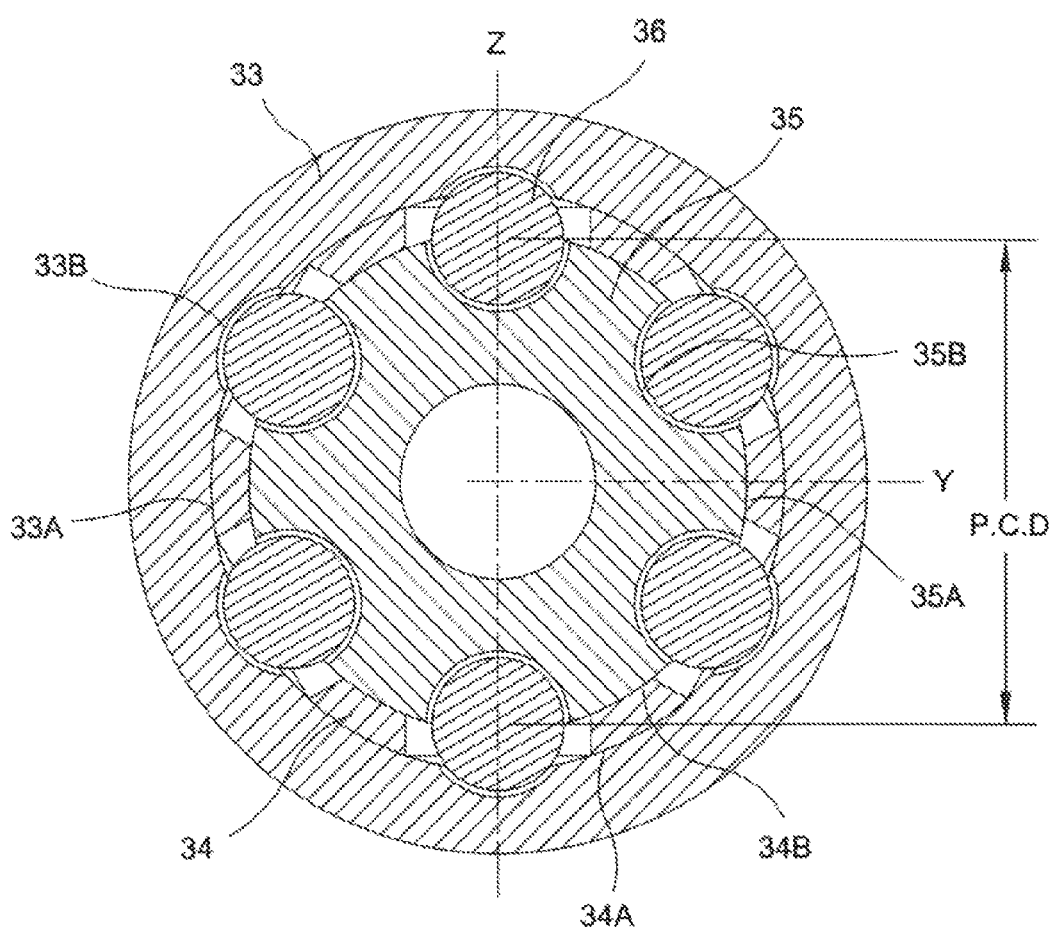
FIG. 9 is a cross-sectional view taken along the line A-A of FIG. 8.
Figure 10:
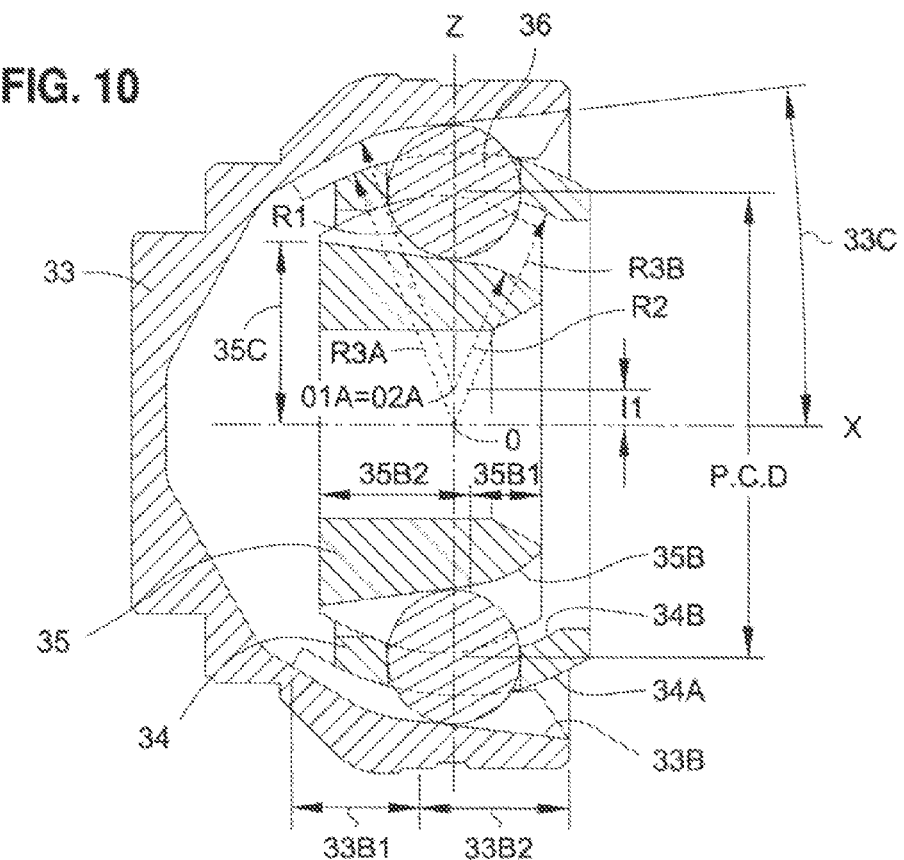
FIG. 10 is a cross-sectional view illustrating the ball type constant velocity joint shown in FIG. 7 when a rotation center of a radial track is positioned above a joint rotation center.
Figure 11:
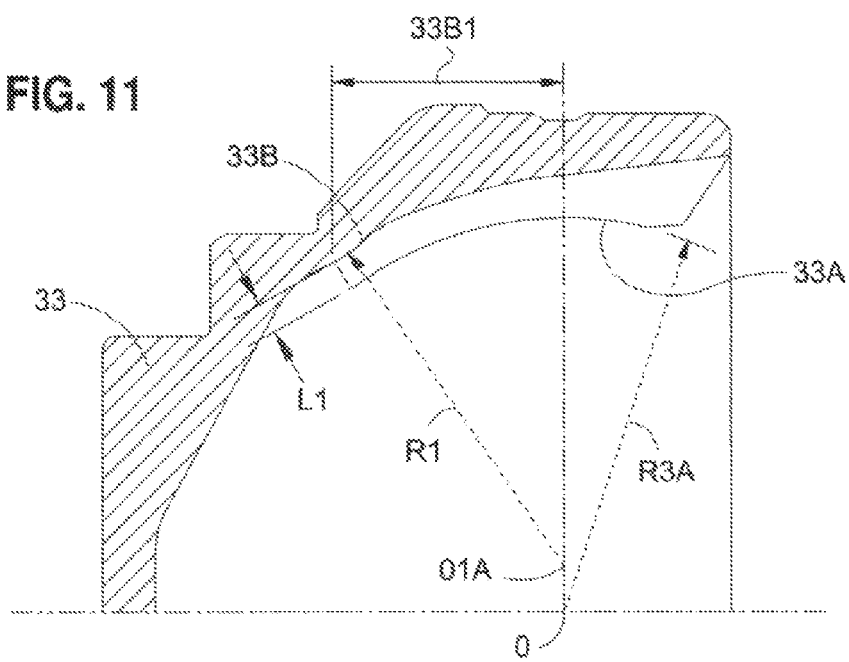
FIG. 11 is a detailed cross-sectional view illustrating essential parts of an outer race in the ball type constant velocity joint shown in FIG. 7 when a rotation center of a radial track is positioned above a joint rotation center.

FIG. 10 is a cross-sectional view illustrating the ball type constant velocity joint shown in FIG. 7 when a rotation center of a radial track is positioned above a joint rotation center, and FIG. 11 is a detailed cross-sectional view illustrating essential parts of an outer race in the ball type constant velocity joint shown in FIG. 7 when a rotation center of a radial track is positioned above a joint rotation center. As shown in FIGS. 10 and 11, the rotation center O1A of the outer race radial track 33B1 and the rotation center O2A of the inner race linear track 35B1 are positioned at the same point on the vertical center axis Z and have the same vertical offset amount f1. In addition, as described above, When the rotation center O1A of the outer race radial track 33B1 and the rotation center O2A of the inner race linear track 35B1 are positioned above the joint rotation center O on the vertical center axis Z, a ratio (f1/PCD) of the offset amount f1 to a pitch circle diameter (PCD) is in the range of 0 to 0.2. The PCD is a distance between centers of two balls 36 opposed to each other about the joint rotation center O.

Figure 12:
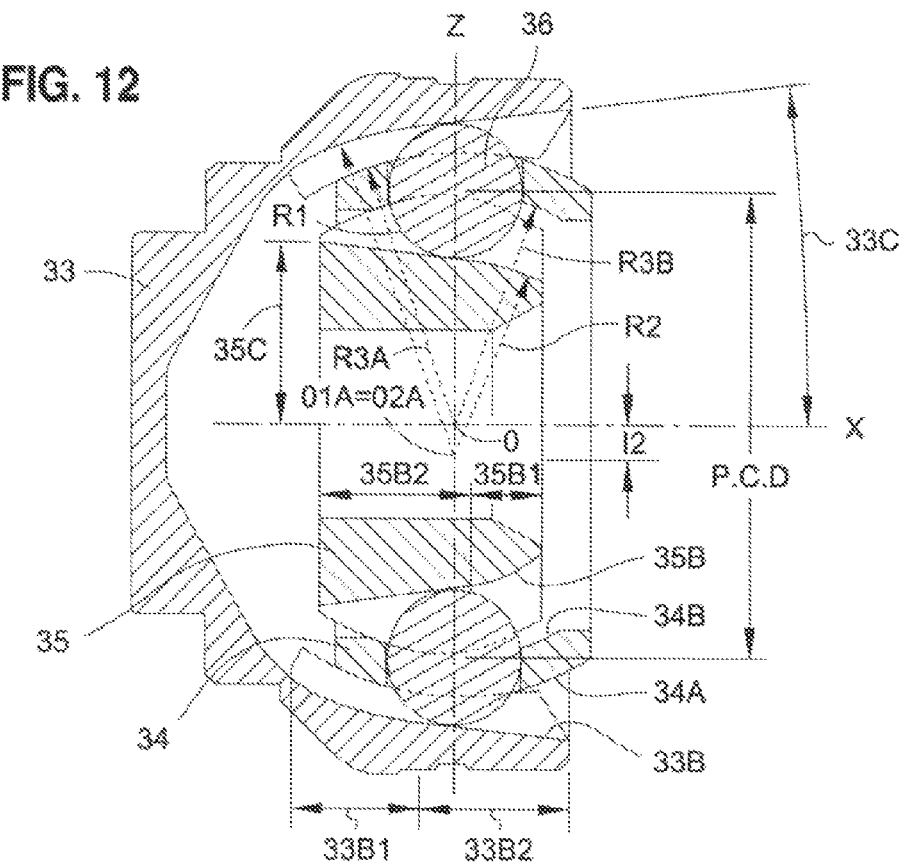
FIG. 12 is a cross-sectional view illustrating the ball type constant velocity joint shown in FIG. 7 when a rotation center of a radial track is positioned below a joint rotation center.
Figure 13:
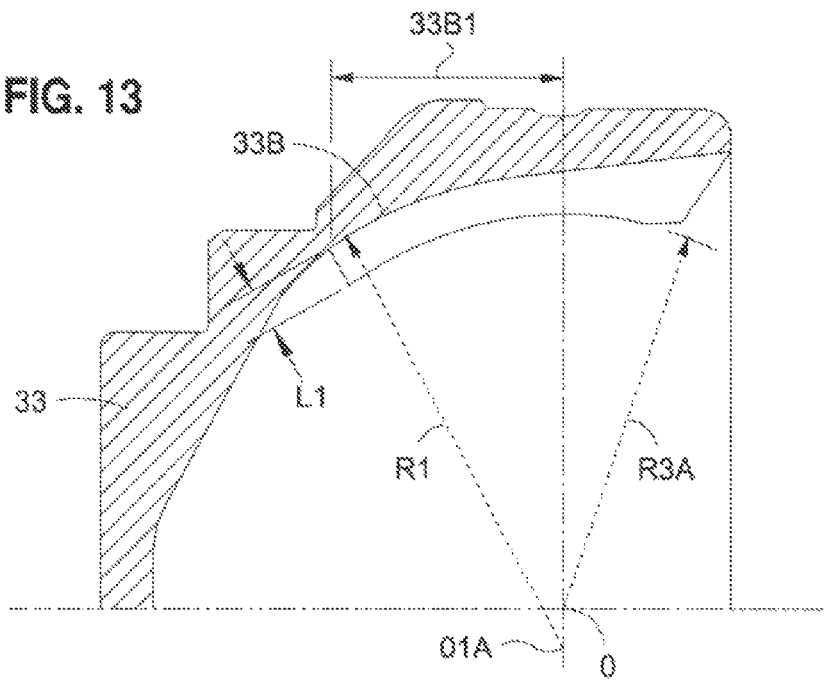
FIG. 13 is a detailed cross-sectional view illustrating essential parts of an outer race in the ball type constant velocity joint shown in FIG. 7 when a rotation center of a radial track is positioned below a joint rotation center.

FIG. 12 is a cross-sectional view illustrating the ball type constant velocity joint shown in FIG. 7 when a rotation center of a radial track is positioned below a joint rotation center, and FIG. 13 is a detailed cross-sectional view illustrating essential parts of an outer race in the ball type constant velocity joint shown in FIG. 7 when a rotation center of a radial track is positioned below a joint rotation center. As shown in FIGS. 12 and 13, the rotation center O1A of the outer race radial track 33B1 and the rotation center O2A of the inner race linear track 35B1 are positioned on the same point below the joint rotation center O on the vertical center axis Z and have the same vertical offset amount f2. In addition, when the rotation center O1A of the outer race radial track 33B1 and the rotation center O2A of the inner race linear track 35B1 are positioned below the joint rotation center O on the vertical center axis Z, a ratio (f2/PCD) of the offset amount f2 to the pitch circle diameter (PCD) is greater than 0.

The joint rotation center O corresponds to a point at which two horizontal center axes X and Y meet the vertical center axis Z.

The inclination angle 33C of the outer race linear track 33B2 and the inclination angle 35C of the inner race linear track 35B2 are in the range of 0 to 10°.

A distance L1 between a circumferential inner surface 33A of the outer race 33 and the outer race radial track 33B1 corresponds to a contact depth with respect to the ball 36.

A circumferential outer surface 34A of the cage 34 has a radius R3A and comes into contact with the circumferential inner surface 33A of the outer race 33.

The circumferential outer surface 34A of the cage 34 has a radius R3B and comes into contact with the circumferential outer surface 35A of the inner race 35.

When a joint angle is not created, the ball 36 is positioned between the outer race linear track 33B2 having an inclination angle 33C and the inner race linear track 35B2 having an inclination angle 35C, imparting directionality to the ball 36, thereby facilitating the actuation of the joint.

Figure 14:
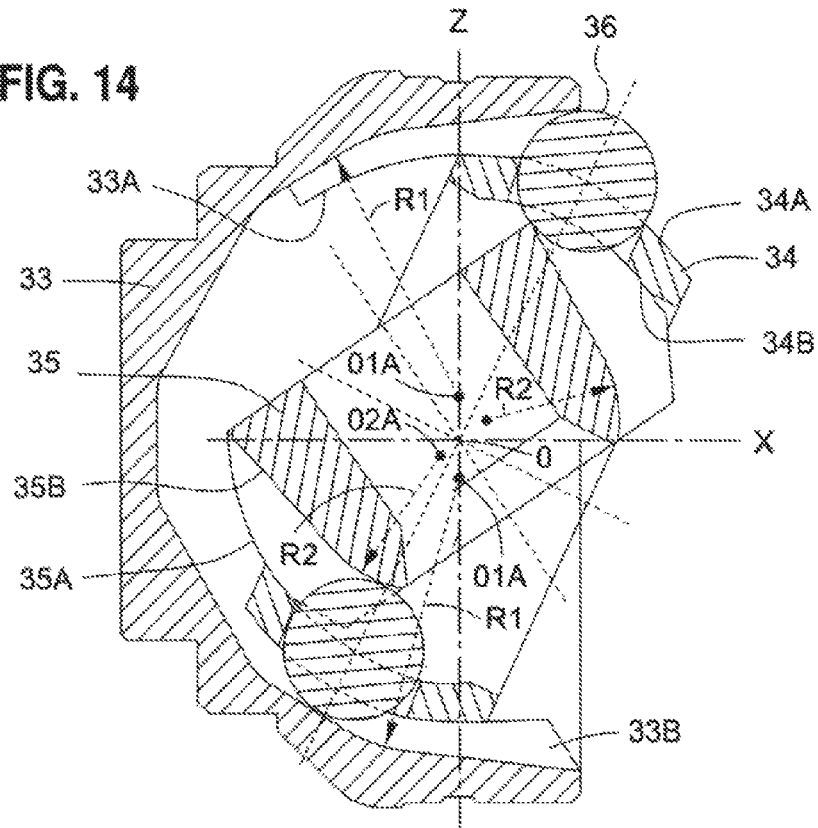
FIG. 14 is a cross-sectional view illustrating the ball type constant velocity joint shown in FIG. 7 when a joint angle is created.
Figure 15:
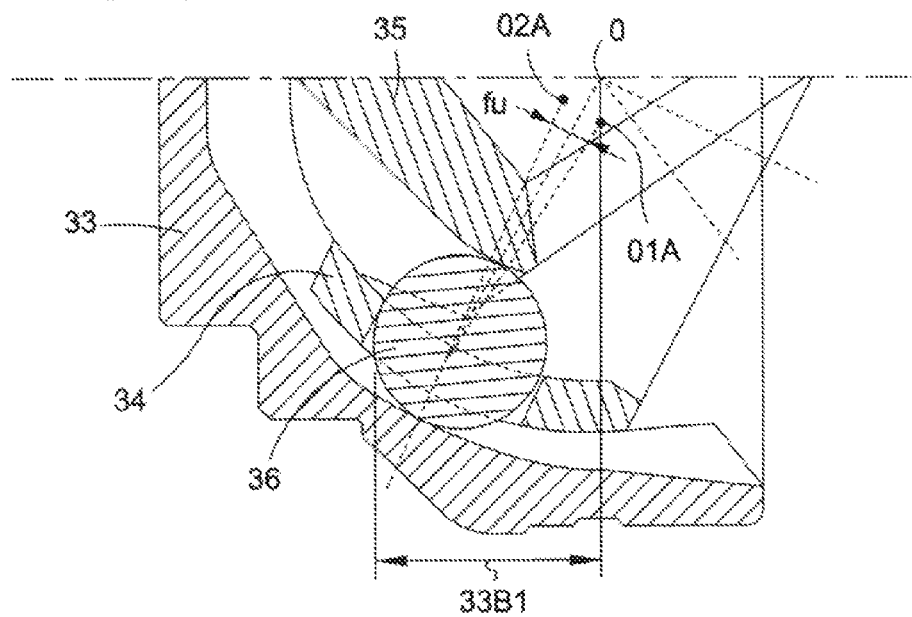
FIG. 15 is a detailed cross-sectional view illustrating essential parts in the ball type constant velocity joint shown in FIG. 7 when a joint angle is created.

FIG. 14 is a cross-sectional view illustrating the ball type constant velocity joint shown in FIG. 7 when a joint angle is created, and FIG. 15 is a detailed cross-sectional view illustrating essential parts in the ball type constant velocity joint shown in FIG. 7 when a joint angle is created. As shown in FIGS. 14 and 15, when a joint angle is created, at least one ball 36 is positioned between the outer race radial track 33B1 and the inner race radial track 35B1, creating a funnel angle (fu).

The funnel angle (fu) is formed between the rotation center O1A of the outer race radial track 33B1 and the rotation center O2A of the inner race linear track 35B1 from the center of the ball 36, thereby facilitating bending and rotating of the joint.

Hereafter, the operation of the ball type constant velocity joint for a vehicle according to an embodiment of the present invention constructed as mentioned above will be described.

As a shaft is rotated by the rotational power outputted from an engine (not shown), the rotational power of the shaft is transmitted to the outer race 33 through the inner race 35 and the balls 36 and wheels (not shown) to which the outer race 33 is coupled are rotated.

In this case, in the ball type constant velocity joint for a vehicle according to the embodiment of the present invention, a rotation angle of the outer race 33 is changed by the balls 36, so that a joint angle is created to a maximum of 54° to follow the displacement of the vehicle. When a joint angle is created, at least one ball 36 is positioned between the outer race radial track 33B1 and the inner race radial track 35B1. When the ball 36 is positioned on the outer race radial track 33B1, the distance L1 between a circumferential inner surface 33A of the outer race 33 and the outer race radial track 33B1 is relatively long. Thus, a contact surface between the ball 36 and the outer race 33 is increased, thereby reducing a contact pressure therebetween.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. A ball type constant velocity joint for a vehicle, comprising:
    an inner race installed at an end of a shaft and defining an inner race ball track divided into two sections consisting of an inner race radial track and an inner race linear track contiguous to the inner race radial track;
    an outer race installed outside the inner race and defining an outer race ball track divided into two sections consisting of an outer race radial track and an outer race linear track contiguous to the outer race radial track;
    a plurality of balls for transmitting rotational power of the inner race to the outer race; and
    a cage having windows for supporting the balls,
    wherein when a joint angle is not created, a rotation center of the outer race radial track and a rotation center of the inner race radial track are spaced from a joint rotation center and positioned at the same point on a vertical center axis and have the same vertical offset amount.

2. The ball type constant velocity joint of claim 1, wherein the rotation center of the outer race radial track and the rotation center of the inner race radial track are positioned at the same point above the joint rotation center on the vertical center axis.

3. The ball type constant velocity joint of claim 2, wherein when the rotation center of the outer race radial track and the rotation center of the inner race radial track are positioned above the joint rotation center on the vertical center axis, a ratio (f1/PCD) of the offset amount (f1) to a pitch circle diameter (PCD) is in the range of 0 to 0.2.

4. The ball type constant velocity joint of claim 1, wherein the rotation center of the outer race radial track and the rotation center of the inner race radial track are positioned at the same point below the joint rotation center on the vertical center axis.

5. The ball type constant velocity joint of claim 4, wherein when the rotation center of the outer race radial track and the rotation center of the inner race radial track are positioned below the joint rotation center on the vertical center axis, a ratio (f1/PCD) of the offset amount (f1) to a pitch circle diameter (PCD) is greater than 0.

6. The ball type constant velocity joint of claim 1, wherein an inclination angle of the outer race linear track is in the range of 0 to 10 degrees.

7. The ball type constant velocity joint of claim 1, wherein an inclination angle of the inner race linear track is in the range of 0 to 10 degrees.

8. The ball type constant velocity joint of claim 1, wherein when a joint angle is not created, the balls are positioned between the outer race linear track having an inclination angle and the inner race linear track having an inclination angle.

9. The ball type constant velocity joint of claim 1, wherein when a joint angle is created, one or more balls are positioned between the outer race radial track having an inclination angle and the inner race radial track having an inclination angle.

10. The ball type constant velocity joint of claim 9, wherein when a joint angle is created, the joint angle becomes 54 degrees to the maximum.

* * * * *